United States Patent [19]
Matsuoka

[11] 3,764,118
[45] Oct. 9, 1973

[54] CONTINUOUS MIXER

[75] Inventor: James T. Matsuoka, Brecksville, Ohio

[73] Assignee: Intercole Automation, Inc., Cleveland, Ohio

[22] Filed: Feb. 17, 1972

[21] Appl. No.: 227,569

[52] U.S. Cl. ............................. 259/192, 259/104
[51] Int. Cl. ............................................. B01f 7/08
[58] Field of Search .................. 259/191, 192, 104, 259/193, 9, 10, 5, 6, 21, 40, 41

[56] References Cited
UNITED STATES PATENTS

| | | | |
|---|---|---|---|
| 3,154,808 | 11/1964 | Ahlefeld | 259/192 |
| 3,239,878 | 3/1966 | Ahlefeld | 259/192 |
| 3,407,439 | 10/1968 | Gregory | 259/192 |
| 3,630,689 | 12/1971 | Wheeler | 259/192 |

*Primary Examiner*—Robert W. Jenkins
*Attorney*—James T. Hoffman et al.

[57] ABSTRACT

Internal or closed chamber high shear mixing apparatus for compounding materials including solid ingredients which become gelatinous at temperatures above ambient temperature, such as, rubber, elastomer, plastic, and like mixes, in a continuous manner having parallel material processing rotors in side-by-side communicating chambers closed except for a material feed opening adjacent one end and a material discharge opening adjacent the other end, the latter opening communicating with a screw controlled discharge aperture directly communicating with the rotor chambers of extensions thereof and offset from and extending transversely of the axes of rotation of the rotors. Each rotor comprises high helix angle mixing blades preceded by a feed screw.

24 Claims, 7 Drawing Figures

CONTINUOUS MIXER

FIELD OF INVENTION

This invention relates to apparatus for continuous compounding of rubber, elastomer, plastic and like mixes by the use of a closed rotor high-shear type apparatus.

PRIOR ART

Apparatus for continuous mixing and/or otherwise processing rubber and like material mixes within a closed chamber by the action of parallel rotors are known. In such devices the intensity of the mixing of the material is a function of many variables including the configuration of the rotors, the direction and speed at which the rotors are rotated, the manner of producing through flow of the material being processed, the rate of material through flow, the temperature of various parts of the apparatus and the material, etc. The rate at which the material being processed is moved through the mixer is typically controlled by a material infeed screw section on the rotors adjacent to the material entrance end of the apparatus and by adjusting the size of the aperture through which the material is discharged at the downstream end of the processing chamber. In a copending application of Armindo Cantarutti and myself, Ser. No. 841,349, filed July 14, 1969, now U.S. Pat. No. 3,700,374, apparatus of the character referred to having a material conveying screw for controlling the rate at which the material being processed is moved through the apparatus.

SUMMARY OF INVENTION

An internal or closed chamber high-shear type continuous material mixing apparatus for compounding rubber, elastomer, plastic, and like mixes, having a material processing rotor in a processing chamber to which material to be processed is fed at one end. The lower part of the opposite end of the processing chamber is intersected by a conduit extending transversely of the processing chamber having therein a material conveying and/or further processing screw having its axis offset below the axis of the material processing rotor for controlling the flow rate of material through the apparatus. The processing rotor has a bladed section, comprising two pairs of helically oriented blades inclined in opposite directions at angles less than 45° to the axis of rotation of the rotor with the pair of blades adjacent to the entrance end preferably longer than the other pair and preceded by a double thread feed screw preferably joined to the adjacent ends of the near pair of blades.

The invention will be better understood and further advantages, as well as objects thereof, will become apparent from the accompanying drawing and ensuing description of the preferred embodiment of the invention.

DESCRIPTION OF PREFERRED EMBODIMENT

Figure 1:
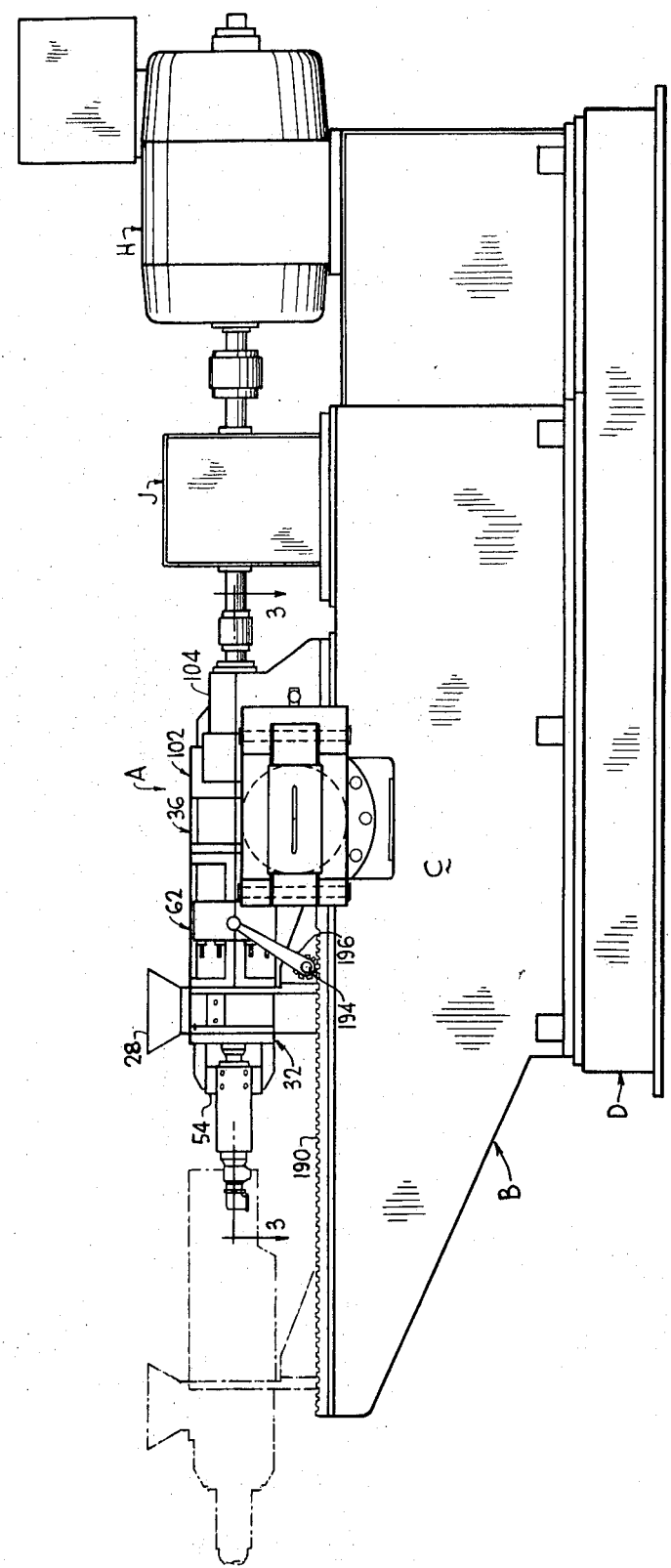
FIG. 1 is a side elevational view of apparatus embodying the present invention.

The preferred embodiment of the invention is a material mixing and extruding apparatus indicated generally by the reference character A and through which material being processed moves continuously. The apparatus comprises a builtup metal frame B including a bed member C supported on a metal base D, two cast metal rotors E, F, having helical material processing blade portions and a cast metal rotatable material conveying screw G, preferably an extruder screw for controlling the flow of material through the apparatus. The rotors E, F are supported for rotation in a tubular chamber the lower part of the downstream end of which is intersected in a chamber or conduit extending transversely thereof and in which the screw G is located. The rotors E, F are rotated in opposite directions by a variable speed electric motor H through a gear-type speed reducer J. The screw G, which is preferably an extruder screw, is rotated by a variable speed electric motor K through a gear-type speed reducer L.

The tubular chamber in which the rotors E, F are supported for rotation comprises two side-by-side elongated partial cylindrical apertures 10, 12, of like diameter and which are in continuous longitudinal communication with one another. The longitudinal communication between the apertures 10, 12 is provided by removing part of the frame which would otherwise separate the apertures to provide an elongated opening 13 between the apertures having a width equal to from about 35 to about 80 percent of the diameter of the apertures. The rotors E, F are provided with material processing blade sections 14, 16 preceded by material conveying screw sections 18, 20 and are located in the apertures 10, 12, respectively. The combined portions of the apertures 10, 12 through which the material conveying screw sections of the rotors extend are hereinafter referred to as the feed chamber M, the combined portions through which the material processing blade sections extend as the mixing chamber N, and the combined portions at the downstream end of the mixing chamber as the discharge chamber P.

Figure 2:
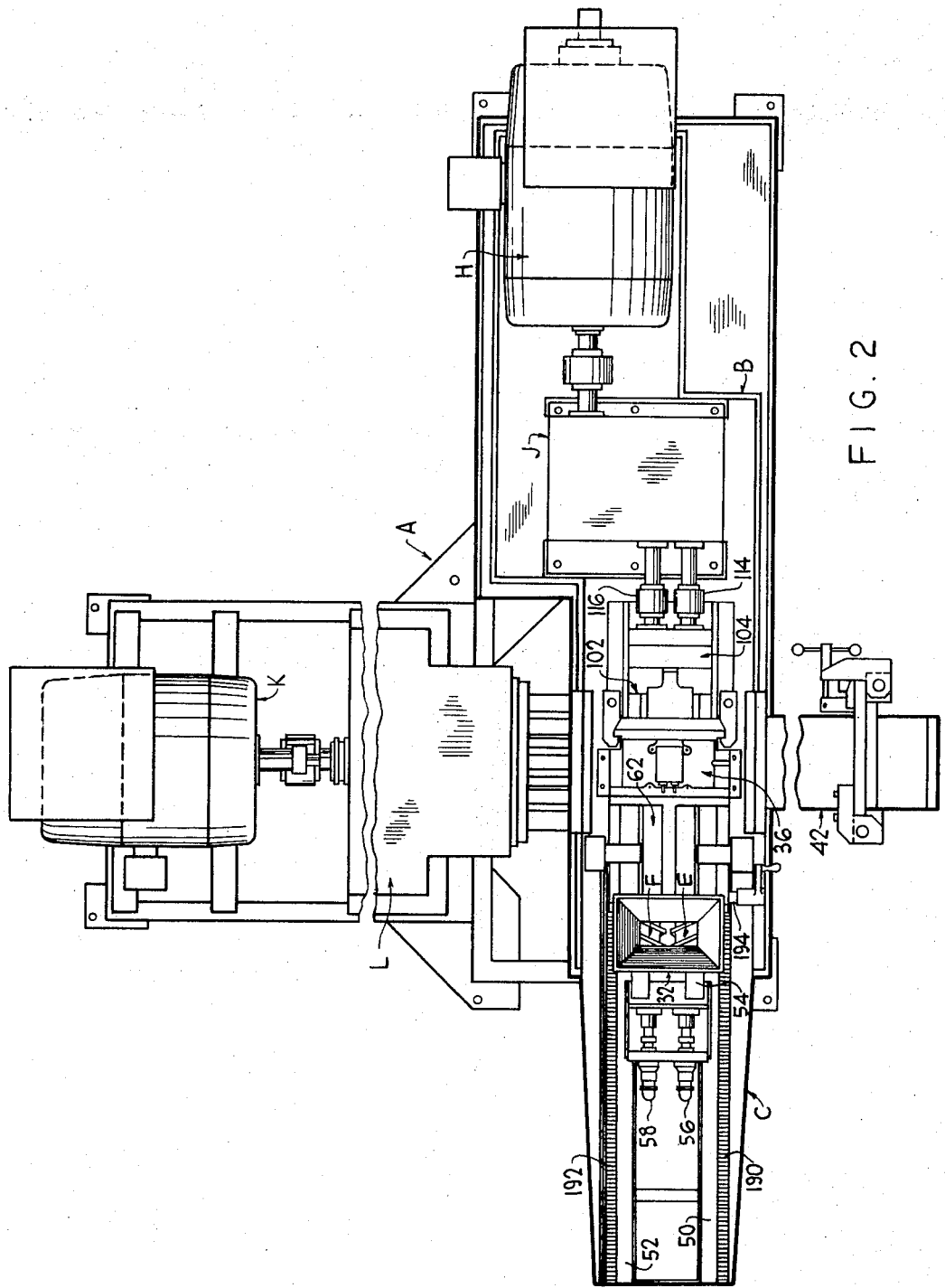
FIG. 2 is a plan view of the apparatus shown in FIG. 1.
Figure 3:
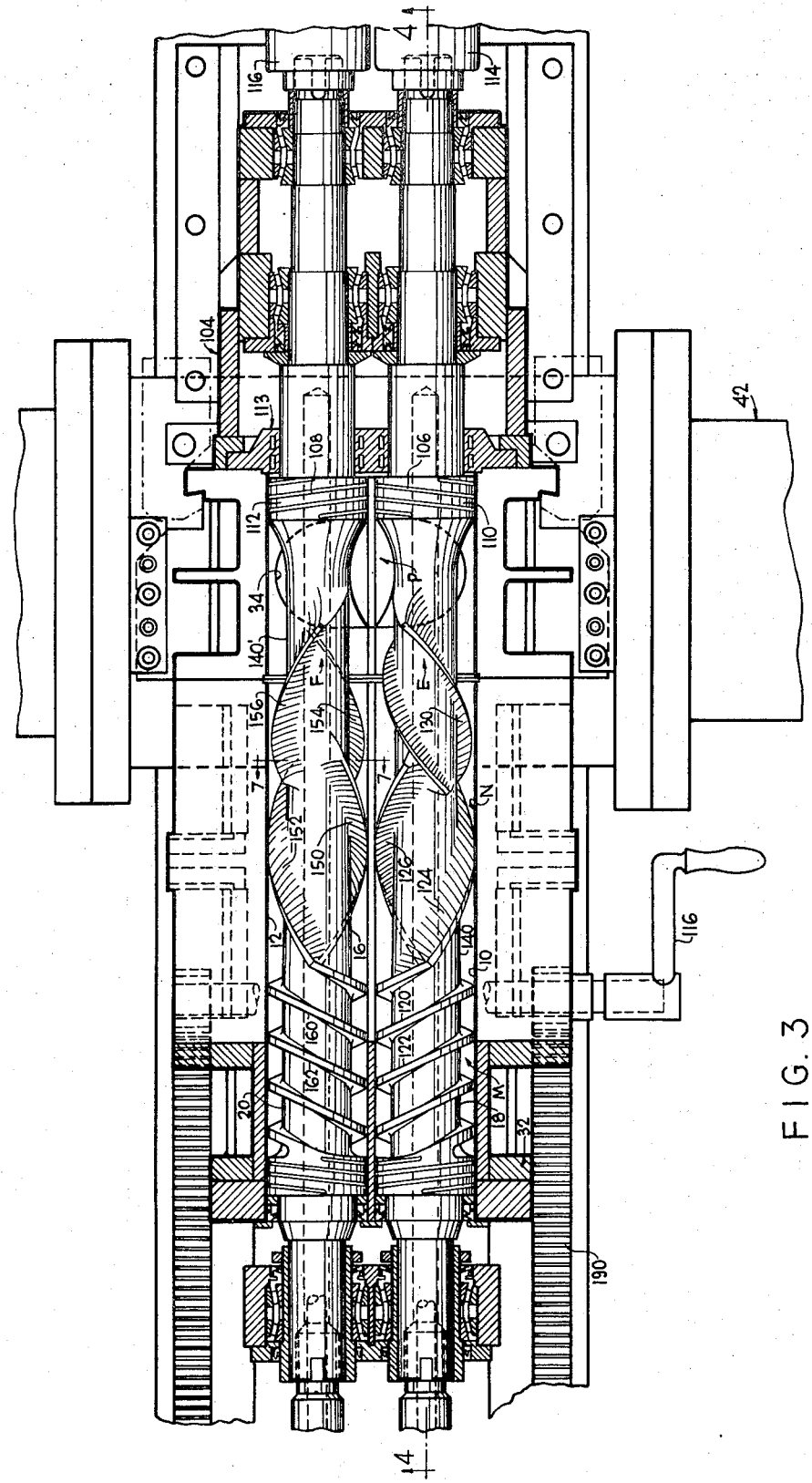
FIG. 3 is a fragmentary sectional view with portions in elevation approximately on the line 3—3 of FIG. 1.
Figure 4:
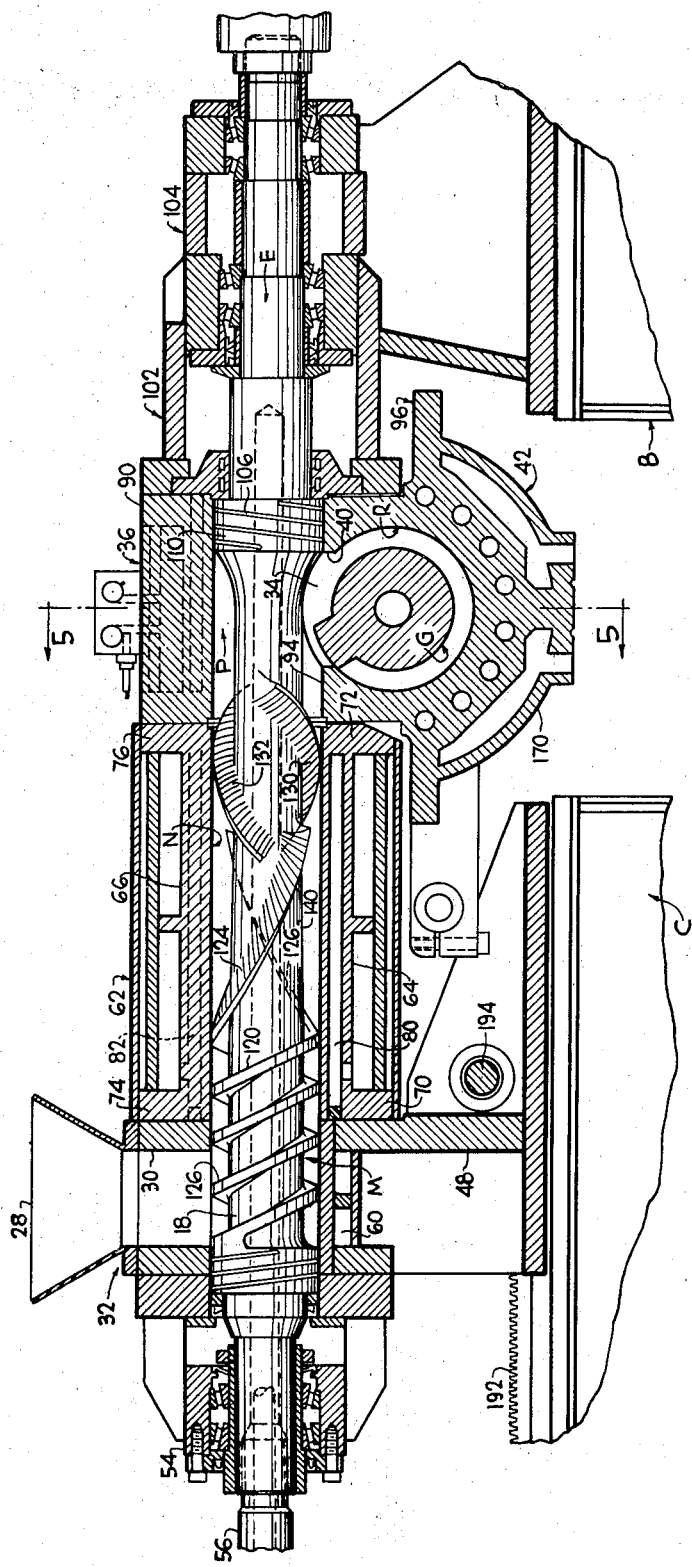
FIG. 4 is a fragmentary sectional view approximately on the line 4—4 of FIG. 3.

Material to be processed is fed to the feed chamber M, as by gravity, through a feed hopper 28 and an aperture 30 in a feed chamber sub-assembly 32 extending downwardly to the top of the feed chamber M. From the mixing chamber N the mixed material is discharged through a downwardly opening aperture 34 in a discharge chamber sub-assembly 36. The discharge chamber P is in effect an extension of the chamber N and both can be considered as and are sometimes referred to as the mixing chamber. The aperture 34 opens into or is in communication with an opening or aperture 40 in a control screw chamber sub-assembly 42 which in turn communicates with a control screw chamber R, that is, an elongated cylindrical aperture within which the control screw G is located, which preferably is an extruder screw. The aperture 40 communicates with the chamber R adjacent to its rear end as the apparatus is viewed in FIGS. 1 and 2.

The feed hopper 28, the aperture 30 and the feed chamber M are a part of the feed chamber sub-assembly and comprises a built-up sub-frame 48 slidably supported at the top side of the bed C for movement along suitable guideways 50, 52 thereon extending lengthwise of the axis of the rotors E, F. A bearing assembly 54, which supports the left-hand ends of the rotors E, F is detachably connected to and carried by the sub-frame 48. The left-hand ends of the rotors E, F engage within the inner races of anti-friction bearings in the bearing assembly 54 with a sliding fit for a purpose hereinafter apparent. Suitable seals are provided adjacent to the adjoining parts of the sub-frame 48 and the bearing assembly surrounding the rotors E, F to prevent the escape of material being processed from the left-hand side of the feed chamber M. The seals are so constructed that they can be slid on and off the ends of the rotors E, F for a purpose hereinafter apparent. Adaptor assemblies 56, 58 carried by the bearing assembly and connected to the left-hand ends of the rotors E, F by slip couplings or connectors provide for the circulation of heat transfer fluid through the rotors. The sub-frame 48 is preferably provided with fluid passageways 60 in the wall of the feed chamber for the circulation of heat transfer fluid, if desired.

The mixing chamber sub-assembly 62 includes a sub-frame 63 comprising upper and lower housing members 64, 66 detachably secured together and terminating at opposite ends in flanges 70, 72 and 74, 76, respectively, and is detachably connected to and carried by the sub-frame 48 by having the lefthand end flanges 70, 74 of the members 64, 66 bolted to the adjoining wall of the sub-frame 48. The members 64, 66 are provided with longitudinally extending drilled apertures 80, 82 located closely adjacent to the inner walls of the mixing chamber and connected to suitable headers, etc. for the circulation of heat transfer fluid therethrough.

The discharge chamber sub-assembly includes a sub-frame 90 abutting against and detachably connected to the end flanges 72, 76 of the mixing chamber housing members 64, 66 and has a planar bottom side 92 which engages and rests upon a planar surface 94 on the top side of a sub-frame 96 of the control screw chamber sub-assembly 42. The sub-frame 96 is supported on the top of the bed C and is connected to the speed reducer L by a spacer assembly 98 detachably connected to the sub-frame 96 and the speed reducer L. The planar surface on the bottom side of the sub-frame 90 is held in close engagement with the planar surface on the top side of the sub-frame 96 by machine screws 100 threaded into suitable tapped apertures in flanges along opposite sides of the sub-frame 90 and engaging the upper side of flanges extending along opposite sides of the sub-frame 96.

Figure 5:
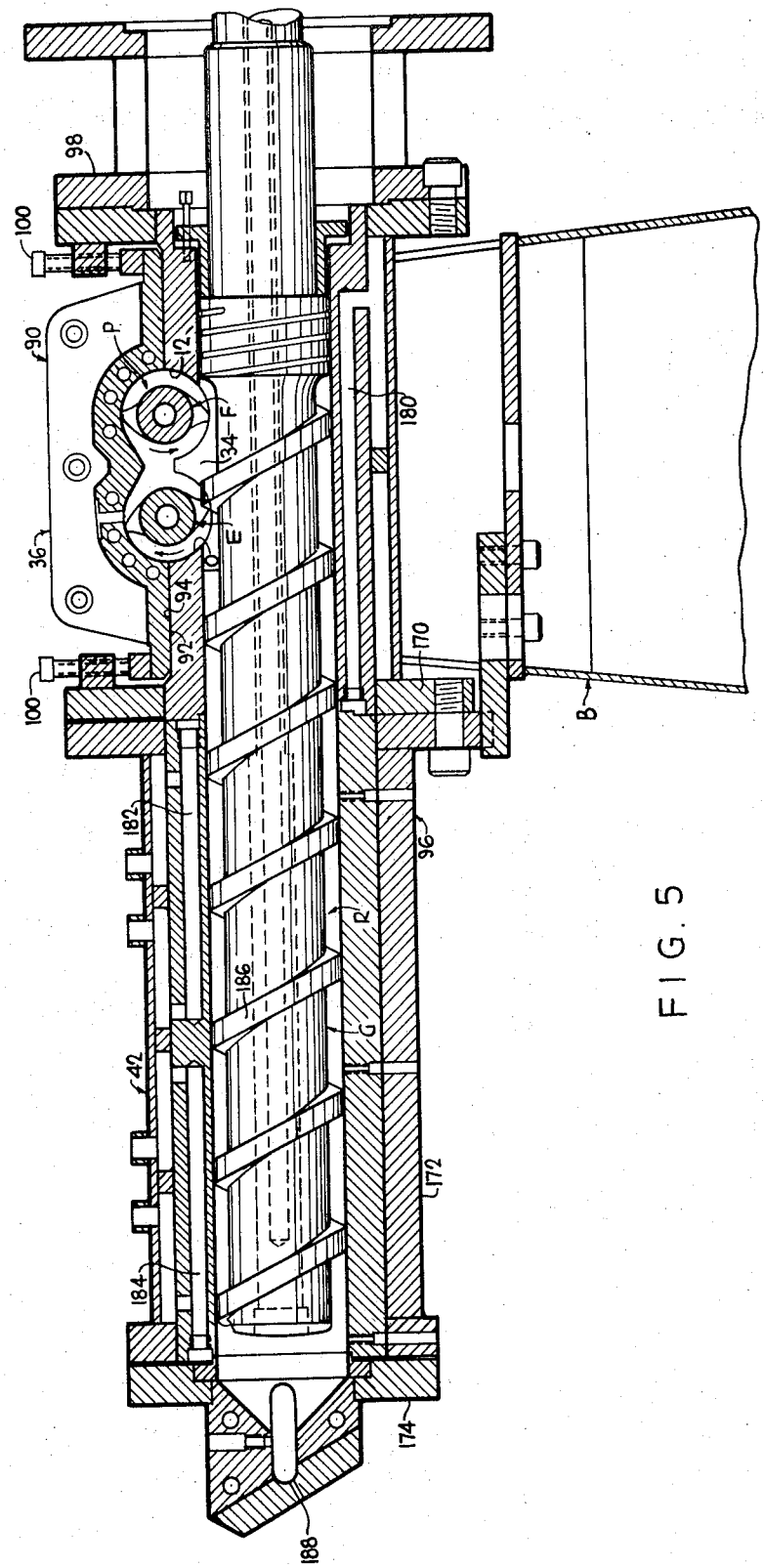
FIG. 5 is a fragmentary sectional view approximately on the line 5—5 of FIG. 4.

The right-hand end of the discharge sub-frame 90 abuts against the left-hand end of a seal assembly 102 connected to and carried by a bearing assembly 104 which rotatably supports the right-hand end of the rotors E, F. The bearing assembly is fixedly connected to the top side of the bed C. Pairs of spiral double grooves 106, 108, in cylindrical sections 110, 112 of the rotors E, F, respectively, at the right hand ends of the cylindrical apertures 10, 12, respectively, assist in relieving pressure of material being mixed from the right-hand end seal 113 of the discharge assembly. The rotors E, F, are driven from the speed reducer J through suitable couplings 114, 116. The rotor E in a clockwise direction, as viewed in FIG. 5 and the rotor F in the opposite direction. The rotor E is the slower of the two rotors and is driven at about 90 to 95 percent of the speed of rotor F.

Both rotors E, F are of similar construction, differing only in that the blades are of different length and are twisted in opposite directions to provide the desired mixing action. Only the rotor E will be described in detail and the rotor F referred to only to the extent necessary to point out the differences between the rotors.

Rotor E may be considered as having a generally cylindrical body portion provided with a double thread feed screw on the material infeed section 18 and mixing blades on the bladed section 14. The blades adjacent to the discharge or downstream end of the rotor extend into the adjoining part of the cylindrical aperture 10 located in the discharge subassembly 36 and terminate above the opening 34. The threads 120, 122 of the infeed section of the rotor terminate adjacent to the entrance or upstream end of the mixing chamber N, and preferably connect with the adjacent ends of the near pair of mixing blades 124, 126, respectively. The threads 120, 122, shown, are of the square type and have a helical or lead angle of about 15° to 40°, preferably about 18°. Other thread constructions, however, may be employed. The rotor E is provided with a second pair of mixing blades 130, 132, at the other or downstream end of the rotor.

The mixing blades have convex leading sides and curve or twist about the rotor body, preferably helically, through about 10° to 195° at angles about 50° to 80°, preferably about 56° to the axis of the rotor. The blades of each pair are preferably of equal length and located 180° from one another and twist in the same direction from one end of the mixing chamber toward the center. The blades of one pair, however, twist or curve in an opposite direction about the rotor from the other pair, so that both pairs twist away from the direction of rotor rotation, considered in the direction from the opposite ends of the rotor toward the center of the mixing chamber. The blades of one pair are displaced angularly from the blades of the other preferably about 90° so that their inner or adjacent ends are peripherally spaced. Assuming that the rotors E, F rotate in the direction indicated by the arrows in FIG. 5, the pair of blades 124, 126 twist as shown in the drawings, that is, with the ends thereof nearest the feed screw threads 120, 122 leading the other ends and their lengths, that is, the lengths of the blades 124, 126, are preferably such that they extend past the center of that part of the mixing chamber which is within the mixing chamber sub-assembly 62 with their inner ends overlapping the adjacent ends of the pair of mixing blades 130, 132. The construction is preferably such that the pair of blades 124, 126 at the entrance end of the mixing chamber, or the mixing section of the rotor, is longer than the parts of the other pair 130, 132 which are of full height, which parts are preferably only from about nine-tenths as long as the blades 124, 126. The overlap of the adjacent ends of the blades is preferably equal to about one-twentieth the length of the mixing chamber N. The angular displacement of the inner ends of the blades provide gaps through which material being mixed can back flow for remixing. The gaps extend radially inward to a depth that approximately corresponds to the periphery of the rotor body portion 140 which is generally cylindrical, preferably with a slight increase in diameter from the center of the bladed section to the infeed end thereof.

The blades 130, 132 extend along the body portion 140 of the rotor E to or approximately to the vertical centerline of the discharge screw G. Beginning at or approximately at the upstream end of the aperture 34 the mixing rotor blades 130, 132 fade or merge into the cylindrical body portion 140 of the rotor on a radius slightly larger than that of the chamber R in which the discharge screw G rotates. The radius is such that it is tangent with the exterior of the rotor body portion at or approximately at the plane of the vertical center line of the discharge screw. From the plane of the vertical center line of the discharge screw, the diameter of the cylindrical rotor body portion increases on the aforementioned radius to the end of the discharge chamber P where it terminates at the cylindrical section 110 of the rotor.

Figure 6:
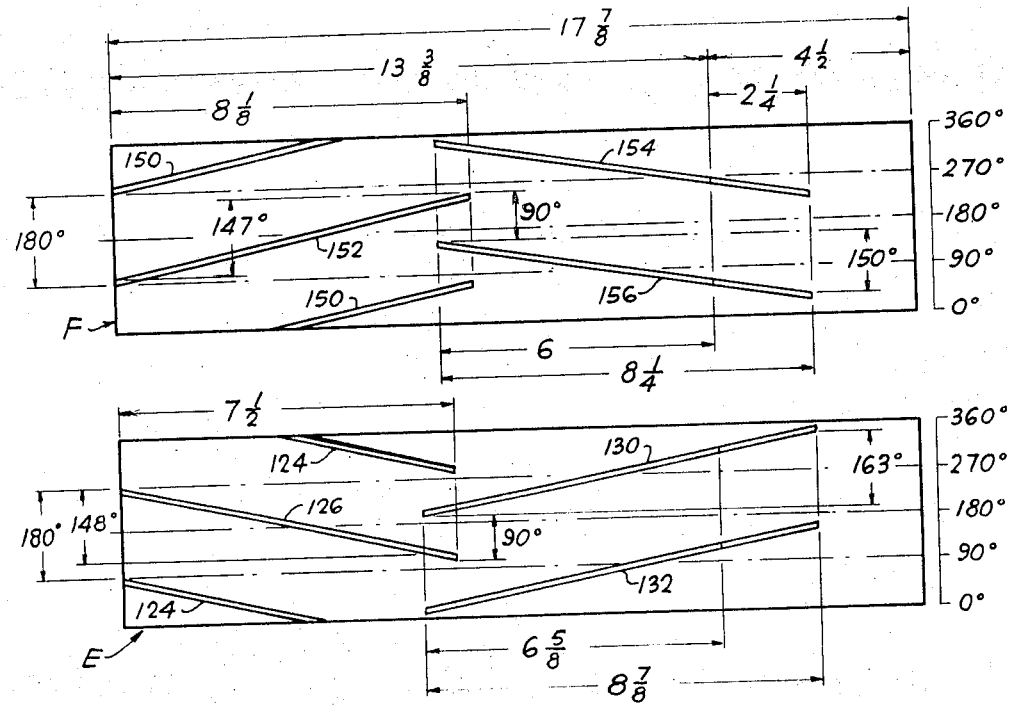
FIG. 6 is a diagrammatic development of portions of the rotors shown in FIGS. 3 and 4.
Figure 7:
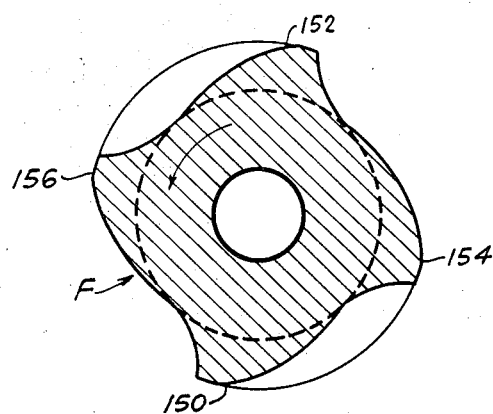
FIG. 7 is a sectional view approximately on the line 7—7 of FIG. 3.

The rotor F is similar to the rotor E except for the relative length of the blades 150, 152 of the pair adjacent to the entrance end of the mixing chamber N to that of the blades 154, 156 of the pair adjacent to the discharge end of the mixing chamber and the fact that the lead or helical angles of the threads 160, 162 on the feed section of the rotor and the blades 150, 152, 154, 156, previously mentioned, are of the opposite lead or angle. The blades 150, 152 are longer than those parts of the blades 154, 156 which are of full height, being preferably about one-third longer and overlap the adjoining ends of the shorter blades 154, 156 about one-twentieth of the length of the mixing chamber. The blades 124, 126 of the rotor E are shorter than the blades 150, 152 of the rotor F and the blades 130, 132 of the rotor E are longer than the blades 154, 156 of the rotor F. The combined length of the pairs 124, 126 and 150, 152 at the infeed end of the mixing chamber is preferably greater than the combined length of the full height parts of the pairs 130, 132 and 154, 156 at the other end of the mixing chamber. The overlapping portions of the blades of the respective rotors are offset relative to one another axially of the mixing chamber. The maximum diameters of the rotors E, F, shown, is approximately four inches and a diagrammatic development view of the mixing blades is shown in FIG. 6, and the cross-sectional shape of the rotors at the mixing blades is similar to that shown in FIG. 7. Any suitably shaped blade, however, may be employed.

While a preferred rotor blade construction has been shown and described, it is to be understood that other constructions may be employed, for example, the construction shown in U.S. Pat. Nos. 3,403,894 and 3,565,403.

The discharge control screw sub-assembly 42 comprises the sub-frame 96 having the cylindrical chamber R within which the screw G driven by the drive K is located. The subframe 96 comprises a housing member 170 which forms the right-hand end of the sub-frame 96, a second housing members 172 detachably bolted to the left-hand side of the member 170 and a die assembly 174 at the discharge end of the housing member 172. The housing member 170 is detachably supported on the base D and both it and the housing member 172 are provided with apertures 180, 182, 184, closely encircling the chamber R in which the discharge screw G is supported for the circulation of the heat exchange medium in the structure forming the chamber R closely adjacent to the interior wall thereof to control the temperature of material being advanced through the chamber R by the screw G. The screw G has a spiral thread 186 thereon of any suitable construction which develops sufficient pressure to extrude the material being processed through the orifice 188 in the discharge die assembly 174.

The axis of the discharge screw G is in a vertical plane normal to the axes of the mixing rotors E, F and is off-set below the mixing rotors such that the thread 186 of the discharge screw just clears the cylinder body portions 140, 140' of the rotors E, F. In the preferred embodiment of the invention shown the height of the mixing rotor blades or, in other words, the radial projection from the body portions 140, 140' of the rotors E, F, is approximately one-fifth the maximum diameter of the bladed portions of the rotors in the mixing chamber with the result that part of the thread 186 at the right-hand end of the control screw G, as viewed in FIG. 5 extends into the lower part of the portions of the cylindrical apertures 10, 12 which form the discharge member P of the apparatus with the result that material being processed is transferred directly from the discharge end of the cylindrical apertures 10, 12 or those parts thereof which make up the discharge chamber P directly to the cylindrical chamber R and the right-hand end of the control screw G.

The construction of the apparatus is such that the discharge control screw can be removed by removing the die assembly 174 and disconnecting the right-hand end of the screw from the speed reducer L, which drives the discharge screw. The screw can then be moved axially out of the chamber R toward the left, as viewed in FIG. 5. With the clamp screws 100 released and the discharge screw removed from the right hand or infeed end of the chamber G the bearing assembly 54, the feed chamber sub-assembly 32, the discharge mixing chamber sub-assembly 62 and the discharge chamber assembly 36 can be moved as a unit axially of the rotors E, F, as illustrated in phantom lines in FIG. 1 clear of the rotors E, F, which remain connected to the seal and bearing assemblies 102, 104, respectively.

For the purpose of facilitating movement of the assemblies 32, 36, 54, 62 as a unit axially of the rotors E, F, the top side of the frame B, is provided with racks 190, 192 immediately to the outside of the guide surface 50, 52 upon which the feed chamber sub-assembly 32 is slidably supported. The racks 190, 192 are continuously in mesh with suitable pinions fixed to a shaft 194 rotatably supported in the sub-frame for the feed chamber sub-assembly and extending to the front of the machine, as viewed in FIG. 1, where it is provided with a hand crank 196 for rotating the same to move the aforementioned unit, including the assemblies 32, 36, 54, 62, axially of the mixing rotors E, F. The unit referred to can be moved towards the left, as viewed in FIG. 1, to expose as much of the mixing rotors E, F, as desired, and any substantial movement of the unit towards the left exposes the aperture 40 in the control screw sub-assembly and the right-hand end of the chamber R as the apparatus is viewed in FIG. 5. If desired, the aforementioned unit can be supported on an auxiliary base for rotation about a vertical axis which auxiliary base is in turn slidably supported on the guide ways 50, 52 thus permitting rotation of the unit after it has been moved sufficiently to the left to clear the left-hand end of the mixing rotors E, F.

In operation, material to be processed is introduced through the feed hopper 28 into the infeed section of the two counter rotating rotors E, F which are driven at a suitable speed by the variable speed motor H. The infeed screw conveys the material to the mixing chamber and the mixing section of the rotors within the mixing chamber. Alternatively, the infeed screws may be omitted and the material introduced directly into the upstream end of the mixing chamber as by moving the infeed opening 16 down stream and/or extending the upstream mixing blades 120, 122 and 150, 152 to the left, as viewed in the drawings. As the material moves into and through the mixing chamber, the blades of the mixing section of the rotor work the material within the mixing chamber in a generally back and forth manner by virtue of the oppositely twisting blades on each rotor and the overlap of the upstream and downstream pairs of blades. In addition, the blades due to their high helix or lead angles which may be from about 50° to 80°, preferably from about 55° to 60°, spread the material within the mixing chamber against the inside surface thereof and shear the material between the blades and the mixing chamber wall. The material is also sheared between the rotor blades. The peripherally displaced inner ends of the blades of each rotor by virtue of the axially overlapping relationship, permit a limited flow of material through the gaps between the inner ends so that the material will in part flow in a torturous mixing path as it is worked by the blades. This provides an intermixing of the material on opposite sides of the blades.

Material within the mixing chamber progressively becomes a stiff homogonized gelatinous mass decreasing in viscosity towards the discharge end. Its movement out of the mixing chamber is in part effected by the mixing blades in the entrance part of the mixing chamber exerting pressure thereon through the more viscous material in the entrance end of the mixing chamber and by the pull or drag thereon effected by the discharge screw G. Lengthening the mixing blades at the entrance end of the mixing chamber relative to the blades at the discharge end enhances the flowthrough pressure exerted on the material being processed by the rotor mixing blades. In the chamber R the material being processed may be further worked by the control screw threads depending upon the construction of the screw.

The mixing process produces heat and the temperature in the various parts of the apparatus can be controlled by the circulation of heat transfer fluid through the various passages which are closely adjacent the inside walls or surfaces of the processing chambers, as already mentioned. The independent control of supply and exhaust of heat transfer fluid to the various chambers permits maximum temperature control and flexibility to establish the required temperature at different locations within the apparatus.

As described above, an apparatus having parallel material processing rotors and a screw controlled discharge has been provided in which the material throughput is affected by operation of a screw in a discharge conduit which conduit is directly in communication with or connected to the material processing chambers. In the event that the outfeed or control screw is an extruder screw, it can be designed to further process or mix the material being processed in addition to the rotor mixing blades. The construction of the frame B and the sub-frames 48, 63, 90, 96, rotor bearing assemblies 54, 104 and some other parts of the apparatus have not been described in detail. Except for apparent differences they are similar to corresponding parts of the apparatus disclosed in the aforementioned application, Ser. No. 841,349.

From the foregoing description of the preferred embodiment it will be apparent that the objects heretofore enumerated and others have been accomplished and that there has been provided a novel and improved apparatus for continuously compounding rubber, elastomer, plastic and like material mixes.

Having thus described my invention, what I claim is:

1. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material processing section comprising blade portions with convex leading sides, twisting in opposite directions, and orientated more lengthwise of the axis of the rotor than circumferentially thereof; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor; means to rotate said screw at a controlled speed; and said structure forming said chamber and said conduit having passageways therein for the circulation of heat exchange medium closely adjacent the interior walls of said chamber and said conduit.

2. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material conveying screw section followed by a material processing blade section comprising blade portions with convex leading sides, twisting in opposite directions, and orientated more lengthwise of the axis of the rotor than circumferentially thereof; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor; and means to rotate said screw at a controlled speed; said structure forming said chamber and said conduit having passageways therein for the circulation of heat exchange medium closely adjacent the interior walls of said chamber and said conduit.

3. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material processing section comprising a pair of blade portions adjacent each end with convex leading sides orientated more lengthwise of the axis of the rotor than circumferentially thereof and each pair twisting in opposite directions with the ends thereof adjacent one another trailing; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis off-set below the axis of said rotor; and means to rotate said screw at a controlled speed; said structure forming said chamber and said conduit having passageways therein for the circulation of heat exchange medium closely adjacent the interior walls of said chamber and said conduit.

4. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material conveying screw section followed by a material processing section comprising a pair of blade portions adjacent each end with convex leading sides orientated more lengthwise of the axis of the rotor than circumferentially thereof and each pair twisting in opposite directions with the ends thereof adjacent one another trailing; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor; means to rotate said screw at a controlled speed; and said structure forming said chamber and said conduit having passageways therein for the circulation of heat exchange medium closely adjacent the interior walls of said chamber and said conduit.

5. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material processing section comprising a discrete pair of blades adjacent each end with convex leading sides, orientated more lengthwise of the axis of the rotor than circumferentially thereof and each pair offset circumferentially and twisting in an opposite direction with respect to the other pair and having their adjacent ends overlapping; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor; and means to rotate said screw at a controlled speed; said structure forming said chamber and said conduit having passageways therein for the circulation of heat exchange medium closely adjacent the interior walls of said chamber and said conduit.

6. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material conveying screw section followed by a material processing section comprising a discrete pair of blades adjacent each end with convex leading sides, orientated more lengthwise of the axis of the rotor than circumferentially thereof and each pair offset circumferentially and twisting in an opposite direction with respect to the other pair and having their adjacent ends overlapping; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor; and means to rotate said screw at a controlled speed; said structure forming said chamber and said conduit having passageways therein for the circulation of heat exchange medium closely adjacent the interior walls of said chamber and said conduit.

7. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material processing section comprising blade portions with convex leading sides, twisting in opposite directions, and orientated more lengthwise of the axis of the rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; said structure forming said chamber and said conduit having passageways therein for the circulation of heat exchange medium closely adjacent the interior walls of said chamber and said conduit; a material conveying screw rotatably supported in said conduit with its axis offset below the axis of said rotor and with a portion of its thread extending into said chamber; and means to rotate said screw at a controlled speed.

8. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material conveying screw section followed by a material processing blade section comprising blade portions with convex leading sides, twisting in opposite directions, and orientated more lengthwise of the axis of the rotor than circumferentially thereof; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; said structure forming said chamber and said conduit having passageways therein for the circulation of heat exchange medium closely adjacent the interior walls of said chamber and said conduit; a material conveying screw rotatably supported in said conduit with its axis offset below the axis of said rotor and with a portion of its thread extending into said chamber; and means to rotate said screw at a controlled speed.

9. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material processing section comprising a pair of blade portions adjacent each end with convex leading sides, orientated more lengthwise of the axis of the rotor than circumferentially thereof and each pair twisting in opposite directions with the ends thereof adjacent one another trailing; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; said structure forming said chamber and said conduit having passageways therein for the circulation of heat exchange medium closely adjacent the interior walls of said chamber and said conduit; a material conveying screw rotatably supported in said conduit with its axis offset below the axis of said rotor and with a portion of its thread extending into said chamber; and means to rotate said screw at a controlled speed.

10. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material conveying screw section followed by a material processing section comprising a pair of blade portions adjacent each end with convex leading sides, orientated more lengthwise of the axis of the rotor than circumferentially thereof and each pair twisting in opposite directions with the ends thereof adjacent one another trailing; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; said structure forming said chamber and said conduit having passageways therein for the circulation of heat exchange medium closely adjacent the interior walls of said chamber and said conduit; a material conveying screw rotatably supported in said conduit with its axis offset below the axis of said rotor and with a portion of its thread extending into said chamber; and means to rotate said screw at a controlled speed.

11. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material processing section comprising a discrete pair of blades adjacent each end with convex leading sides, orientated more lengthwise of the axis of the rotor than circumferentially thereof and each pair offset circumferentially and twisting in an opposite direction with respect to the other pair and having their adjacent ends overlapping; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; said structure forming said chamber and said conduit having passageways therein for the circulation of heat exchange medium closely adjacent the interior walls of said chamber and said conduit; a material conveying screw rotatably supported in said conduit with its axis offset below the axis of said rotor and with a portion of its thread extending into said chamber; and means to rotate said screw at a controlled speed.

12. In apparatus for compounding materials including solid ingredients which become gelatinous at above ambient temperature, such as, rubbers, elastomers, plastics, and like mixes: structure forming a tubular material processing chamber; a rotor supported for rotation in said chamber and having a material conveying screw section followed by a material processing section comprising a discrete pair of blades adjacent each end with convex leading sides, orientated more lengthwise of the axis of the rotor than circumferentially thereof and each pair offset circumferentially and twisting in an opposite direction with respect to the other pair and having their adjacent ends overlapping; means for rotating said rotor at a controlled speed; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; said structure forming said chamber and said conduit having passageways therein for the circulation of heat exchange medium closely adjacent the interior walls of said chamber and said conduit; a material conveying screw rotatably supported in said conduit with its axis offset below the axis of said rotor and with a portion of its thread extending into said chamber; and means to rotate said screw at a controlled speed.

13. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material processing section comprising blade portions with convex leading sides, twisting in opposite directions, and orientated more lengthwise of the axis of the rotor than circumferentially thereof; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor; and means to rotate said screw at a controlled speed; said structure forming said chamber and said conduit having passageways therein for the circulation of heat exchange medium closely adjacent the interior walls of said chamber and said conduit.

14. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing blade section comprising blade portions with convex leading sides, twisting in opposite directions, and orientated more lengthwise of the axis of the rotor than circumferentially thereof; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor and means to rotate said screw at a controlled speed; said structure forming said chamber and said conduit having passageways therein for the circulation of heat exchange medium closely adjacent the interior walls of said chamber and said conduit.

15. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material processing section comprising a pair of blade portions adjacent each end with convex leading sides, orientated more lengthwise of the axis of the rotor than circumferentially thereof and each pair twisting in opposite directions with the ends thereof adjacent one another trailing; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor; and means to rotate said screw at a controlled speed; said structure forming said chamber and said conduit having passageways therein for the circulation of heat exchange medium closely adjacent the interior walls of said chamber and said conduit.

16. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing section comprising a pair of blade portions adjacent each end with convex leading sides orientated more lengthwise of the axis of the rotor than circumferentially thereof and each pair twisting in opposite directions with the ends thereof adjacent one another trailing; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor; and means to rotate said screw at a controlled speed; said structure forming said chamber and said conduit having passageways therein for the circulation of heat exchange medium closely adjacent the interior walls of said chamber and said conduit.

17. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material processing section comprising a discrete pair of blades adjacent each end with convex leading sides, orientated more lengthwise of the axis of the rotor than circumferentially thereof and each pair offset circumferentially and twisting in an opposite direction with respect to the other pair and having their adjacent ends overlapping; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor; and means to rotate said screw at a controlled speed; said structure forming said chamber and said conduit having passageways therein for the circulation of heat exchange medium closely adjacent the interior walls of said chamber and said conduit.

18. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing section comprising a discrete pair of blades adjacent each end with convex leading sides, orientated more lengthwise of the axis of the rotor than circumferentially thereof and each pair offset circumferentially and twisting in an opposite direction with respect to the other pair and having their adjacent ends overlapping; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor; and means to rotate said screw at a controlled speed; said structure forming said chamber and said conduit having passageways therein for the circulation of heat exchange medium closely adjacent the interior walls of said chamber and said conduit.

19. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material processing section comprising blade portions with convex leading sides, twisting in opposite direction, and orientated more lengthwise of the axis of the rotor than circumferentially thereof; means for rotation said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor and with a portion of its thread extending into said chamber; and means to rotate said screw at a controlled speed; said structure forming said chamber and said conduit having passageways therein for the circulation of heat exchange medium closely adjacent the interior walls of said chamber and said conduit.

20. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing blade section comprising blade portions with convex leading sides, twisting in opposite directions, and orientated more lengthwise of the axis of the rotor than circumferentially thereof; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor and with a portion of its thread extending into said chamber; and means to rotate said screw at a controlled speed; said structure forming said chamber and said conduit having passageways therein for the circulation of heat exchange medium closely adjacent the interior walls of said chamber and said conduit.

21. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material processing section comprising a pair of blade portions adjacent each end with convex leading sides, orientated more lengthwise of the axis of the rotor than circumferentially thereof and each pair twisting in opposite directions with the ends thereof adjacent one another trailing; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor and with a portion of its thread extending into said chamber; and means to rotate said screw at a controlled speed; said structure forming said chamber and said conduit having passageways therein for the circulation of heat exchange medium closely adjacent the interior walls of said chamber and said conduit.

22. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing section comprising a pair of blade portions adjacent each end with convex leading sides, orientated more lengthwise of the axis of the rotor than circumferentially thereof and each pair twisting in opposite directions with the ends thereof adjacent one another trailing; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor and with a portion of its thread extending into said chamber; and means to rotate said screw at a controlled speed; said structure forming said chamber and said conduit having passageways therein for the circulation of heat exchange medium closely adjacent the interior walls of said chamber and said conduit.

23. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material processing section comprising a discrete pair of blades adjacent each end with convex leading sides, orientated more lengthwise of the axis of the rotor than circumferentially thereof and each pair offset circumferentially and twisting in an opposite direction with respect to the other pair and having their adjacent ends overlapping; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis off-set below the axis of said rotor and with a portion of its thread extending into said chamber; and means to rotate said screw at a controlled speed; said structure forming said chamber and said conduit having passageways therein for the circulation of heat exchange medium closely adjacent the interior walls of said chamber and said conduit.

24. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing section comprising a discrete pair of blades adjacent each end with convex leading sides, orientated more lengthwise of the axis of the rotor than circumferentially thereof and each pair offset circumferentially and twisting in an opposite direction with respect to the other pair and having their adjacent ends overlapping; means for rotating said rotors in opposite directions at controlled speeds; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor and with a portion of its thread extending into said chamber; and means to rotate said screw at a controlled speed; said structure forming said chamber and said conduit having passageways therein for the circulation of heat exchange medium closely adjacent the interior walls of said chamber and said conduit.

* * * * *